United States Patent [19]

Pinsley

[11] Patent Number: 4,468,108

[45] Date of Patent: Aug. 28, 1984

[54] FOLDABLE PHOTOGRAPHIC OBJECT AND CAMERA SUPPORT

[75] Inventor: Jules Pinsley, 84-21 Smedley St., Jamaica, N.Y. 11435

[73] Assignees: Peter Humphrey, New York; Jules Pinsley, Tuxedo Park, both of N.Y.

[21] Appl. No.: 388,981

[22] Filed: Jun. 16, 1982

[51] Int. Cl.³ .............................................. G03B 17/00
[52] U.S. Cl. ................................................... 354/293
[58] Field of Search ................................... 354/80–82, 354/290–293; 352/243; 248/277; 211/201, 202; 355/55–59

[56] References Cited

U.S. PATENT DOCUMENTS 552,259 12/1895 Peckinpaugh et al. ............... 355/56
3,672,104 6/1972 Luckey ............................ 248/277 X
4,166,687 9/1979 Viering ............................. 354/290

FOREIGN PATENT DOCUMENTS 399408 7/1924 Fed. Rep. of Germany ........ 355/55

Primary Examiner—John Gonzales
Attorney, Agent, or Firm—Kane, Dalsimer, Kane, Sullivan & Kurucz

[57] ABSTRACT

This device provides a portable foldable cart that can be used for photographing flat art objects. It comprises a first frame 3 with a support structure 43 provided to support the object to be reproduced, a second frame 2 provided to support the camera and an connecting structure 1 comprising of a number interconnected lazy tongs. The supporting structure 43 has a second set of lazy tongs so that it can be adapted to different sized objects.

Thus the device can be adapted for a large variety of objects and conditions. It can also be folded up in a small package for storing or transportation.

3 Claims, 13 Drawing Figures

FOLDABLE PHOTOGRAPHIC OBJECT AND CAMERA SUPPORT

This invention relates to copystands that can be used for photographic reproductions and more particularly to a folding stand that can be hand-carried to the site of the reproduction.

BACKGROUND OF THE INVENTION

It is often desirable for educational, cultural or other general purposes to photograph art works or other subjects. In order to get the best results such photographing has been normally performed in the controlled environment of a studio, however if the subject art work is precious, such as a painting of a great master, the transfer of the art work to the studio is invariably associated with security problems. Therefore, there is a need for a portable device which can be taken to the site of the art work itself.

OBJECTIVES AND SUMMARY OF THE INVENTION

The objective of this invention is to provide a device which enables the photography of large or small art objects or other objects while maintaining alignment between the object and the camera.

Another objective is to provide a device which is foldable for easy storage or transportation.

A further object is to provide a device which can be set up and packed up fast to speed up the whole photographing process. Other advantages of the invention are found in the description below.

The above objectives are attained by the present device which is provided with a first frame adapted to hold the object to be reproduced, a second frame adapted to hold the reproducing means and a connecting structure supporting said first frame at a first end and said second frame at a second end. The connecting means may be easily expanded and contracted to change the distance between the camera and the object and it comprises a plurality of interconnected lazy tongs. In order to accommodate objects of various sizes, the first frame comprises two vertical bars connected by three interconnected supporting lazy tongs, in a perpendicular direction to the connecting structure.

DESCRIPTION OF THE PREFERRED EMBODIMENT

The device described herein is referred to as a Copycart because it is a device which provides for the photography of flatart such as paintings, graphics, etc. in size up to 8 feet wide and 8 feet high, opaque or translucent, enabling cameras from 35 mm to 11×14 inch formats to be used. The Copycart maintains accurate alignment between the camera and the copy throughout its working distance which ranges from less than 1 ft., 2 inches to over 19 feet. These distances will be modified somewhat by the proportions of the cameras used. A camera elevator and a choice of several heavy duty camera heads or platforms provide for flexibility in the use of any camera desired. The other function implied in the name Copycart embraces that of portability. When it is in the closed mode for travelling, it is easily transportable in most vehicles; the locking handles make it convenient to lift its weight, of less than 60 pounds. The large-diameter rubber-tired casters permit travel over any normal flooring surface. Provision for carrying photographic equipment is supplied by two storage boxes and a rubber mat covered table with a raised edge, or lip, keeps various paraphernalia within easy reach of the operator(s). The center casters of both ends are provided with a brake so that any extension of the Copycart can be locked in by the operator.

The Copycart, according to this invention comprises a rear end frame 2, a front end frame 3 and a connecting structure 1.

Figure 1:
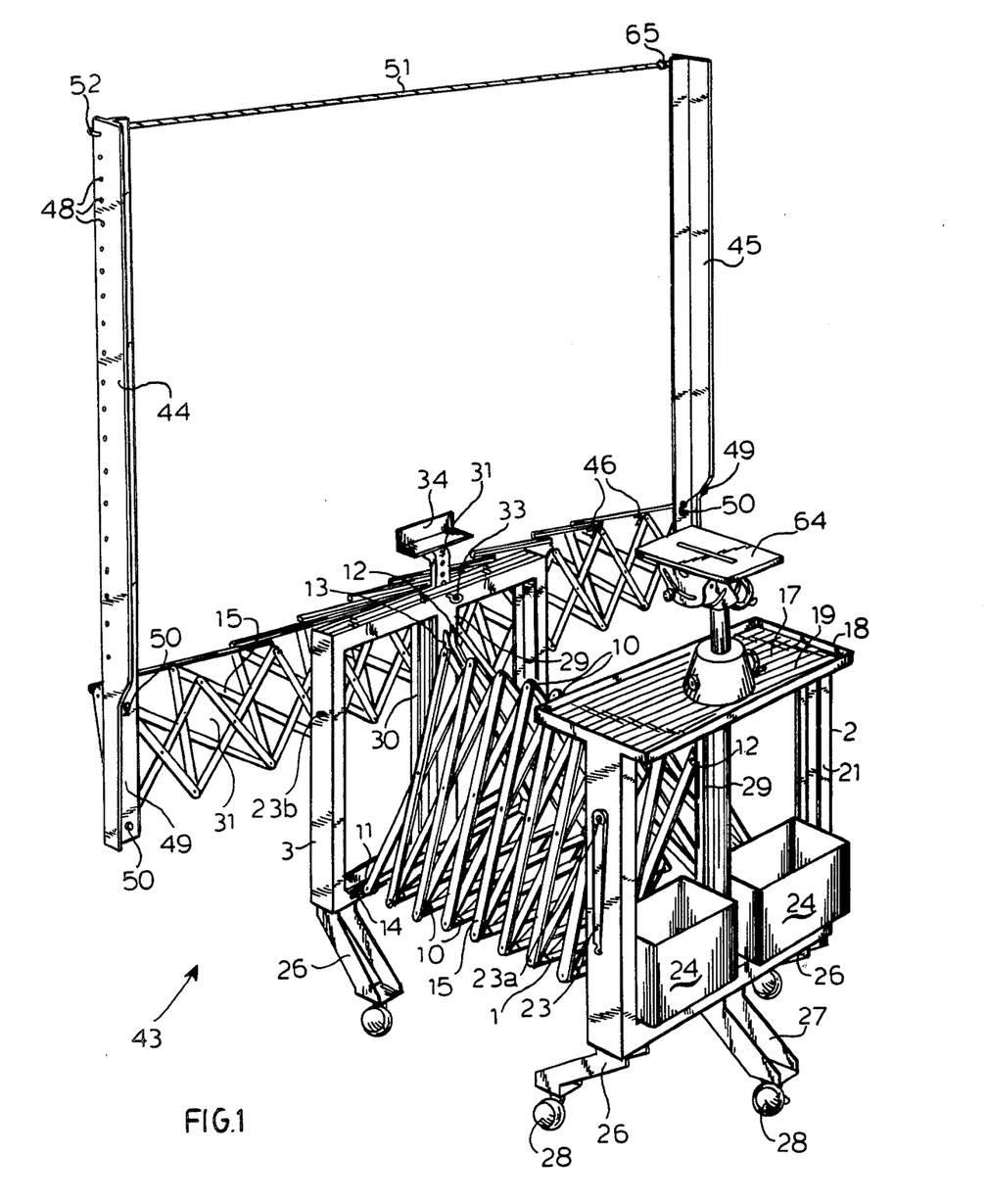
FIG. 1 shows a side view of the invention.
Figure 2:
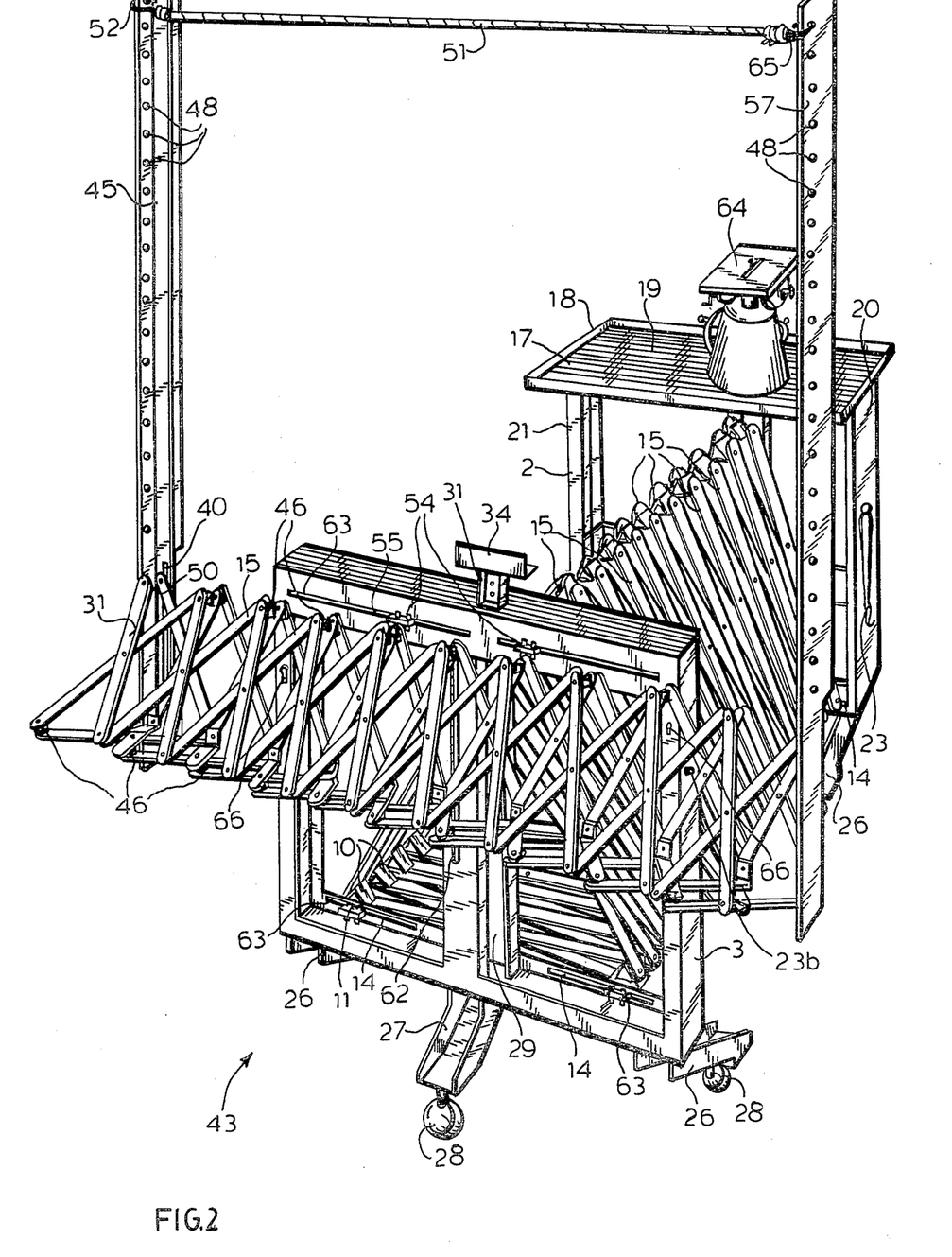
FIG. 2 shows a rear view of the invention.
Figure 3:
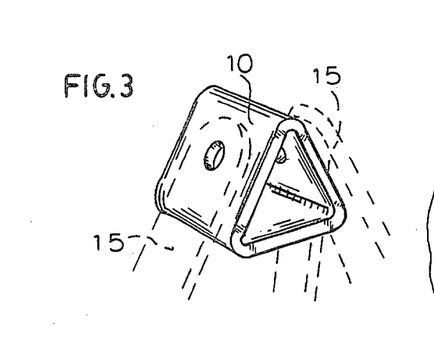
FIG. 3 shows the triangular interconnecting means between the tongs of the connecting structure.
Figure 4:
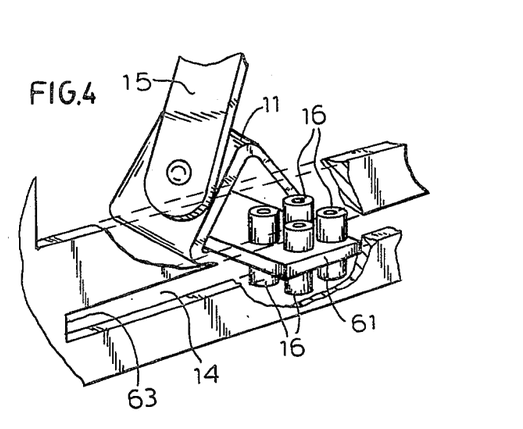
FIG. 4 shows the method of connecting the connecting structure to horizontal slots in the frames.

The connecting structure is composed of three triangulated lazy tongs (see FIGS. 1 and 2). The three lazy tongs are connected by brackets 10 (FIG. 3). Each of these brackets is also a triangular device of equal sides, of an appropriate width and height with holes to accept a means for fastening bars 15 together to make the lazy tong assembly 1. The six end joints of the connecting structure are held together by connecting means 11 and 12 which have a protruding bar 60 and 61 made integral with the triangular shells 11 and 12, so positioned that the tongue 60 is in a vertical position when approximately fastened to the upper end bars of lazy tong 1 and thus will mate the travel in vertical slot 13 in center strut channels 29 on the inner faces of end frames 2 and 3. Both tongues 60 and 61 have an arrangement of rollers 16 positioned to bear against the inner and outer faces of the walls of the end frames 2 and 3 and of the center strut channels 29 having the slots 13 and 14, into which the tongues 60 and 61 protrude and which permit the necessary travel of the lazy tongs 1 as it is extended and contracted. The endings 63 of the slots 14, 13, 9, 6 and 49 limit the travel of the lazy tongs. Connectors 11 are made so that they travel horizontal in slots 14 which are positioned in in the lower, outer ends of end frames 2 and 3.

Figure 5:
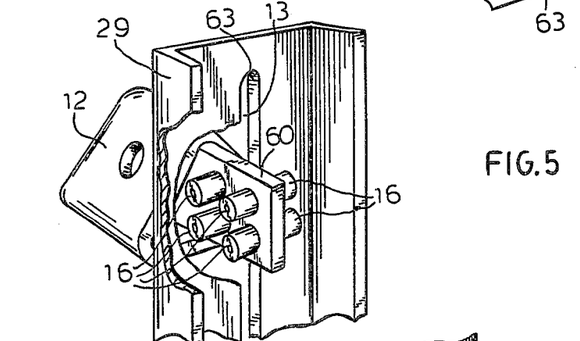
FIG. 5 shows a method of connecting the connecting structure to vertical slots in the frames.

The end frames 2 and 3 are of generally similar dimension and construction, consisting of 4 sides made of channel beams, the open sides of the channels facing inward. End frame 2 is the front, or camera bearing frame. It consists of a tray 17 with a raised edge or lip 18 covered with a textured rubber mat 19 mounted on the top member of the frame 2. A camera elevator and head system 64 is mounted in the frame 2, so that it rests on the tray 17 as well. The inner face of frame 2 has a smaller size channel 29 vertically disposed and centered, joined at top and bottom to the top and bottom members of the frame 2. This strut 29 has a vertical slot 13 (FIG. 5) to accept the tongue 60 of convertor 12. Resting upon and attached to the bottom member of the end frame 2 are two storage boxes 24 (FIGS. 1 and 2). On the side vertical members 20 of end frame 2 are attached, the locking handles 23 which have a keyhole arrangement in the free end so that the handle 23 which pivots on the pin 23A may fasten securely to pin 23B on the end-frame 3, keeping the Copycart closed during transportation and storage.

Attached to the underside of end-frame 2 and 3 are four caster-supporting fixed brackets 26 and arranged so that the casters are inwardly oriented towards the center of the Copycart. Attached to the center of the underside of each frame 2 and 3, is a swively bracket 27 bearing a braking casters 28 so that the caster is outward or away from the center of the Copycart. This method provides a broad, stable base for the machine, yet the protruding central casters can be turned inward for ease and compactness in transport.

The rear frame 3, FIGS. 1 and 2, carries the removable copyholder 43 FIG. 1. The top of the frame 3 is covered with a rubber mat 19. On the side members are the appropriate pins 23B to accommodate the locking handle assembly 23. The frame also has two channel struts 29 and 30. Strut 29 is similar to strut 30 of frame 2, described above. Channel 30 is centrally located, vertically disposed on the outer face of rear end frame 3, the open side of the channel facing inward and attached top and bottom to frame 3. On the face of channel 30 is a slot 62 FIGS. 2 and 7. At the top of slot 62 is a rectangular opening or keyhole 61 FIG. 7, to receive fitting 32 FIG. 7. The rollers 16 which engages each side of slot 62 permitting the travel of fitting 32.

Figure 9:
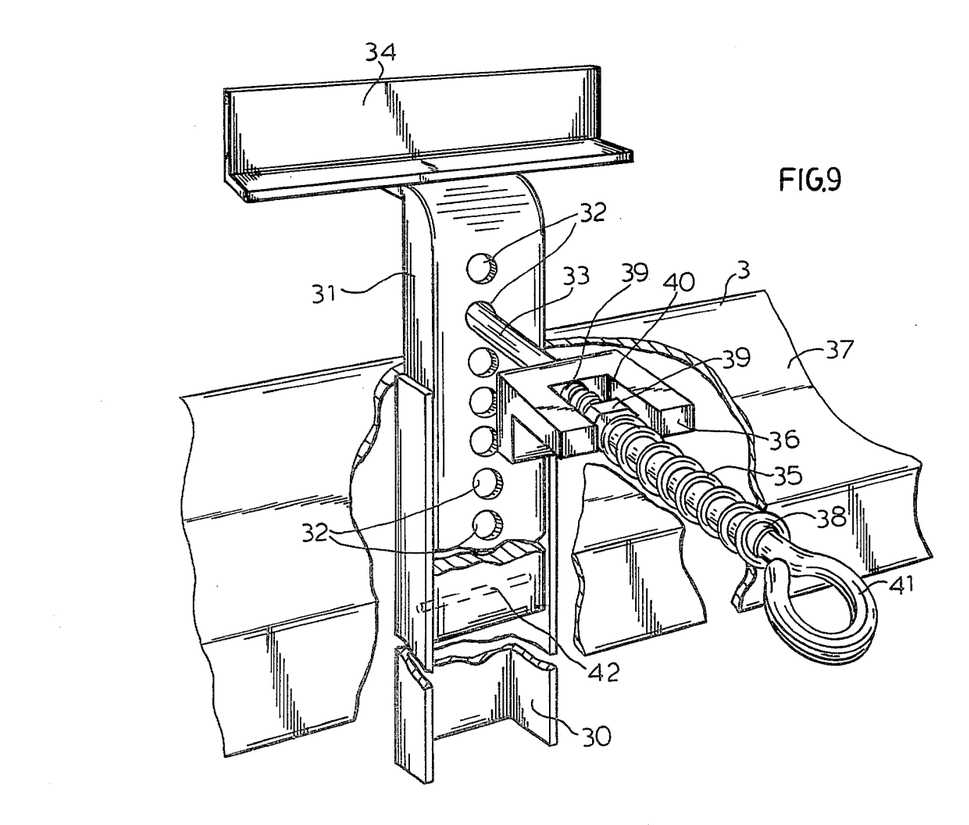
FIG. 9 shows the mechanism used to keep the angle member at a certain height.

Sliding up and down inside the outer channel member 30, FIG. 9, is a smaller sized channel member 31, having a number of holes 32 arranged vertically in the face of the channel and carrying on top an angle member 34 FIG. 9, for the purpose of supporting the bottom part of any copy material. Member 31 passes through a "U" shaped aperture conforming to member's 31 dimensions, in cross-section, and at the lower end a stop 42 is fitted to prevent the inadvertent separation of member 31 from the rear end frame 3.

Attached to the underside of the top member 37 of rear end frame 3 is a fitting 36 which is comprised of an angle piece having a hole 39 which is aligned transversely with hole 38 and is centered in the vertical face of top member 37 of rear end frame 3. Through these two holes 37 and 38 passes a pin 33 formed with an eye or loop 41 at one end; this loop 41 extends beyond the side outer face of top member 37 of rear end frame 3 and bears against it as a result of the pressure of spring 35 mounted on the pin 33 against the inner vertical surface of top member 37 and at spring its 35 inner end, against the spring tension adjusting nut 39 held in slot 40 of fitting 36, the adjustment being made by turning the pin 33 by means of eye 41. The other end of pin 33 passes through holes 32 in member 31 supporting it at a desired height above top member 37. To change the position of member 31, the operator pulls pin 33 outward against the spring 35 disengaging the pin 33 from hole 32, adjusts member 31 to the desired position, and upon releasing pin 33, the spring 35 tension engages the appropriate hole 32 with the end of pin 33.

Figure 6:
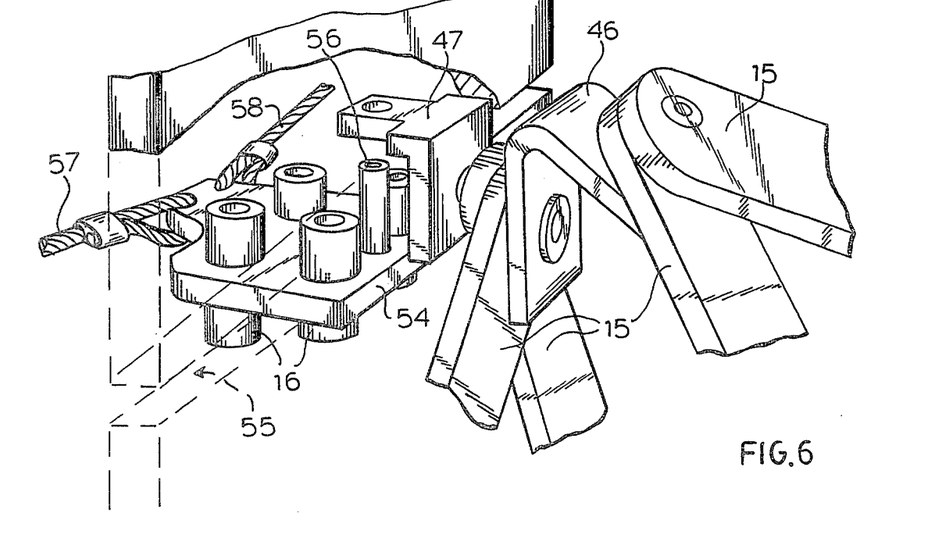
FIG. 6 shows details of first frame and the supporting tongs.
Figure 8:
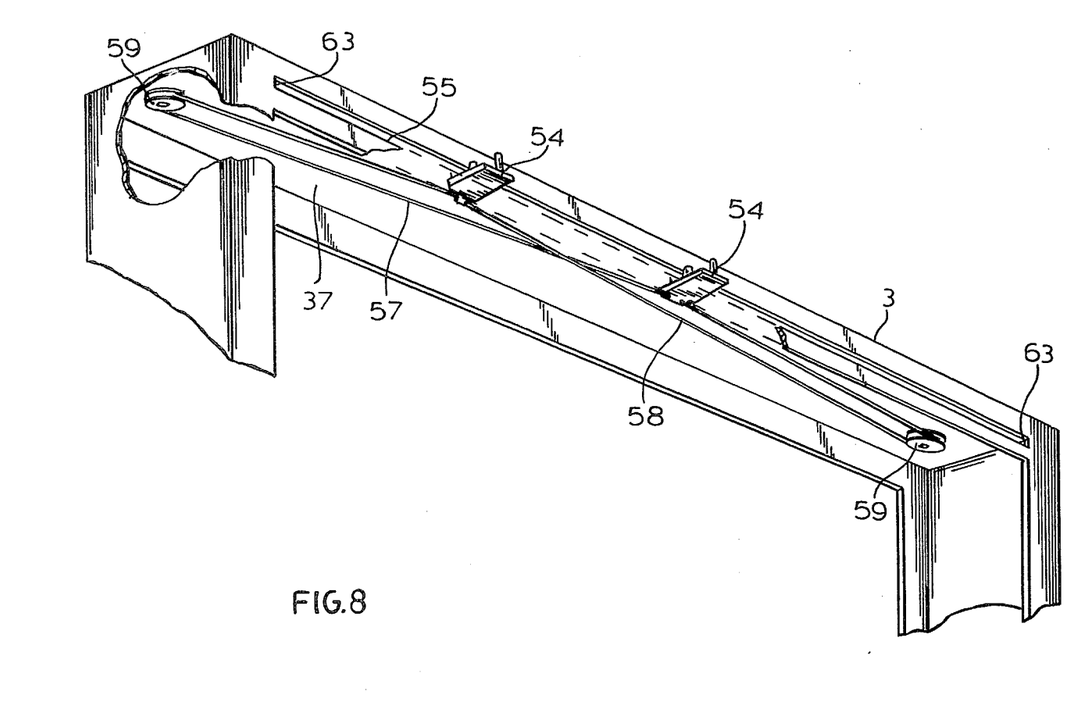
FIG. 8 shows the mechanism used to keep the two side channels mounted on the first frame equidistant from the center of said frame.

The copyholder unit 43, FIG. 1, is comprised of a smaller triangulated lazy tong system 31 FIGS. 1 and 2, centrally and removably attached to rear end frame 3 by means of two carriages 54, FIG. 6, and carriage 32, FIG. 8, travelling in slots 55 and 62 respectively, causing the outer ends of the lazy tongs system 31 to move inward and outward in opposed directions equally.

The four outer bar 15 ends of lazy tongs 31 engage vertical slots 49, FIGS. 1 and 2, movably by means of attaching means 50. Slots 49 are in the lower parts of members 44 and 45 and a number of holes 48 are arranged vertically in the rear end of side copyholder T bars 44 and 45. The forward part of the T bar is left free to engage the sides of the copy material. The holes 48 engage the hooks 52 and 65, FIGS. 1, 2 and 13, said hooks being affixed to elastic cord 51. Hook 65 is designed to be engaged at any length along the elastic cord 51, bringing pressure to bear on members 44 and 45 and holding the copy material snuggly.

Members 44 and 45 travel in a vertically held position on the ends of the lazy tongs 31, moving inward and outward equally, thus centering the copy laterally. This movement is controlled additionally, by a restraining means such as the system shown on FIG. 8, in which the tabs 54, FIGS. 6 and 8, travel horizontally in slots 55 cables 57 and 58 and are attached to rear of tabs 54 as follows. The left-hand tab 54 takes cable 57 in a hole at left rear of tab 54, cable 57, travels left around the left side pulley 59, FIG. 8, and back to left side hole in right-hand tab 54. Tab 54 on the right has cable 58, FIG. 8, going from the right hand hole in tab 54 on the right to right hand pulley 59 around the pulley 59 and back to the right hand hole in rear of left hand tab 54. This system is mounted on the underside of the top member 37 of rear end frame 3 (note that in FIG. 8, the lower rollers 16 and tabs 54 have been omitted for clarity). Tabs 54, FIG. 6, have a number of rollers 16, mounted vertically so that they engage both sides of the face in which the slot 55 is made. A centrally placed pin 56 is fixed on the outer edge of tab 54, FIG. 6, so that it may be engaged by fitting 47, FIG. 6, which is affixed to the two upper joints left and right of center of lazy tong 31, FIG. 2, and as shown in FIG. 6, where the same attaching means that holds bars 15 to connecting fitting 46 also holds movably fitting 47. Fitting 47 has a hole designed to engage pin 56; on tab 54 thus affixing the upper left and right of center members of lazy tongs 31 to be centrally and equalizing the system shown in FIG. 8.

Figure 7:
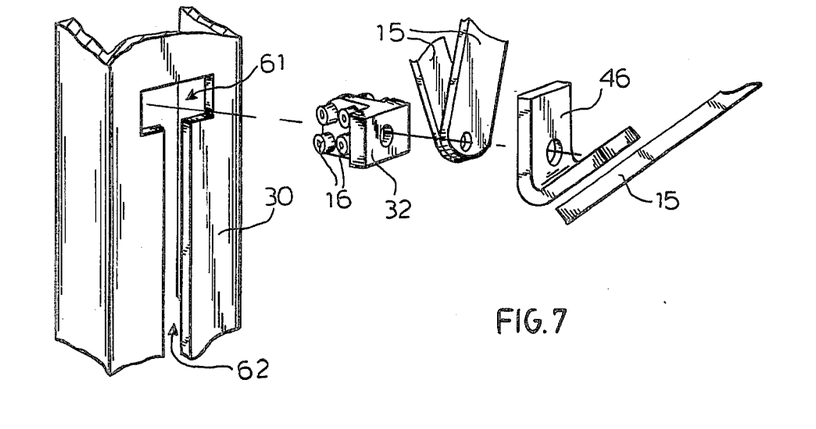
FIG. 7 shows a method of installing the supporting tongs into vertical slots of the first frame.

The lower central joint of lazy tongs 31 engages slot 62 in member 30 of rear end frame 3, FIG. 2; FIG. 7 is an exploded view of these parts. The bars 14 attach movably to connector 46 by same attaching means holding fitting 32 movably which has a number of rollers 16 disposed laterally so as to engage both sides of members 30 bearing slot 62. Fitting 32 is T shaped in plan view, has a hole in the back with a cavity in the tongue holding the rollers 16 to accept a fastening means. The fitting 32 passes through the rectangular aperture 61 at top of slot 62 in member 30 and drops into slot 62 rollers 15 engaging as described above. The removal and attachment of copyholder unit 43 is accomplished by engaging fitting 32 in slot 62 in member 30 FIG. 7, through aperture 61, lowering unit 43 into slot 62 until the two upper fittings 47 can engage the two pins 56 on the two tabs 54 fixed movably in slot 55, FIG. 2, and FIG. 7. Gravity will keep the copyholder unit 43 in place securely. The copyholder is removed to facilitate transportation, and when it is not used, as in the case where an existing copyholding system exists. For that purpose, 2 keyhole apertures 66, FIG. 2, are provided so that the Copycart can be affixed to the appropriate fittings installed in a wall under such a copy board or copyholding system.

The central caster 28, 2, on swiveling bracket 27 turned inward; the unit should rest on its casters, leaving the forward end free to be used in the normal manner. The keyholes 66, FIG. 2, may also be used to store the Copycart on a wall where floor space is limited.

Figure 10:
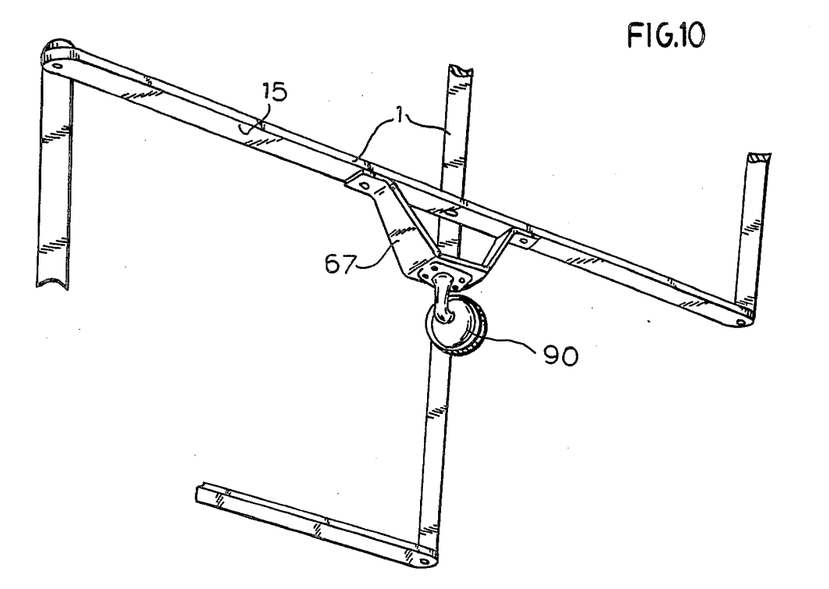
FIG. 10 shows the caster disposed at the bottom of the connecting structure to prevent sagging.

The method of construction of the copyholder lazy tong unit 31 is similar to that of the larger unit 1, connectors 24 are used to attach bars 15 to form the lazy tong unit 31, but it should be noted that the copyholding lazy tong unit is attached centrally leaving the ends free to move in and out. The larger lazy tong unit has frames at both ends and is free in the middle. There is a centrally attached caster 90 with its bracket 67 attached to the underside of a center bar 15 of the lower horizontal rack of lazy tongs 1, FIG. 10. The function of this caster is to prevent the lateral sag of the lazy tong unit.

The Copycart can be built so that in the closed mode, it takes up less than four square feet of floor space. Where high space costs or lack of space exists, the Copycart enables the user to perform other functions in the sizable areas required for copying large works, by closing it up and wheeling it away.

The lazy tong concept is used as the extensible means because its ratio of extension to closure is large. In the preferred embodiment used, the unit when closed measures 9 inches as against over 18 feet (192") extended.

Figures 11, 13:
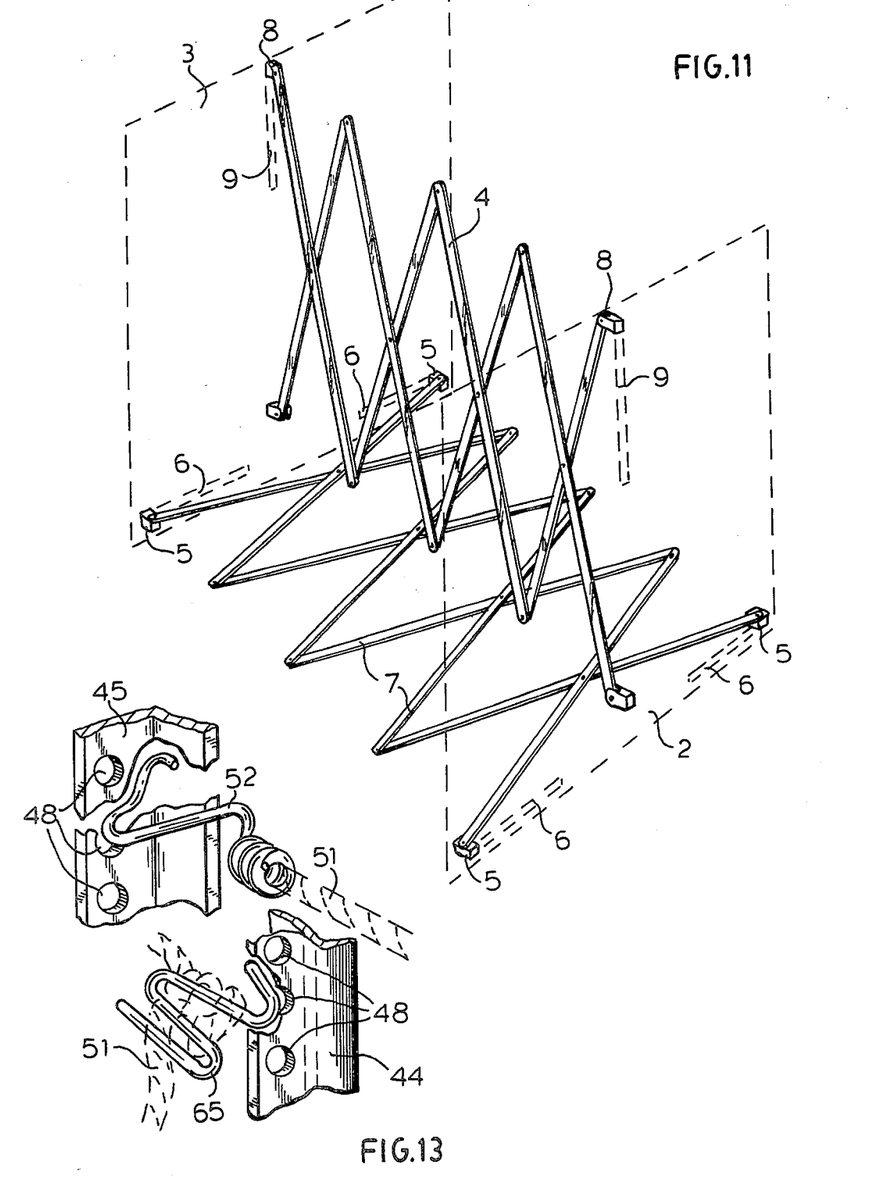
FIGS. 11 and 12 show alternate embodiments of the connecting structure.
FIG. 13 shows a hook for securing rope 51 to bars 44, 45.
Figure 12:
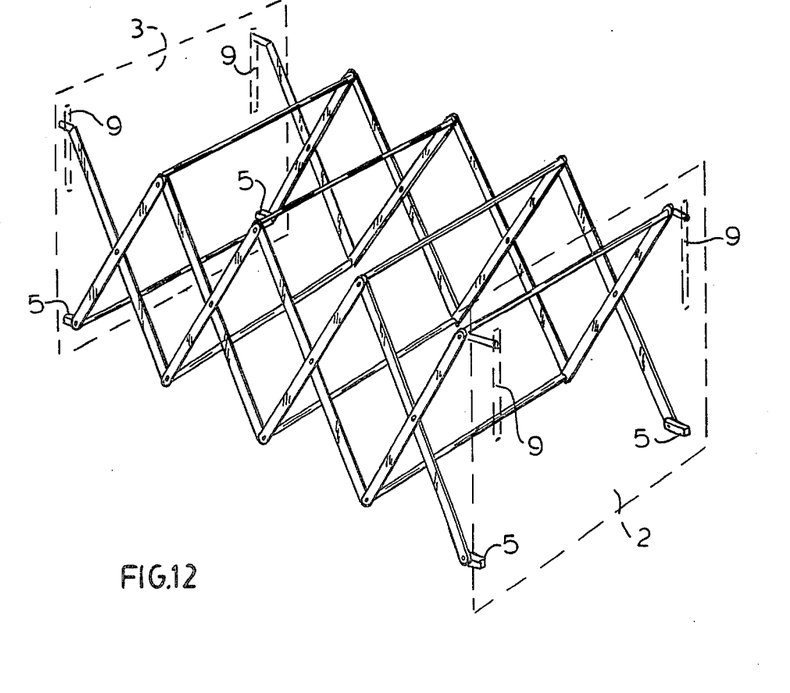

Two other embodiments shown in FIGS. 11 and 12 have also been tried. These embodiments were considered because, they utilize two interconnected lazy tongs instead of three however, they were found to be less stable than the triangular arrangement described above.

FIG. 11 shows a structure in which two lazy tongs interconnected in an inverted T are used. In FIG. 12, the expanding structure is shown which also used only two lazy tongs but these tongs are parallel to each other and they are interconnected by cross-bars. Where an existing copy system is installed, the use of the Copycart in its place enables the space to be used for other functions at no increase in overhead.

some idea of the savings in labor can be gotten from the results of a test shooting in which two operators took three and one half hours to do a location job using a 35 mm camera on a tripod, exclusive of lighting set-up and packing time. When this work was performed with the Copycart, it took less than one hour.

In good weather, the Copycart can be brought outside, using natural lighting thus, saving time of setting up lighting.

For rear projection, a translucent screen may be placed in the copy holder, and a projector placed on the camera head or platform.

I claim:

1. A foldable object and camera support comprising:
   a first frame for holding the object;
   a second frame for holding the camera;
   a foldable connecting structure adapted to dispose said first and second frame at a variable distance with respect to each other and comprising first three triangulated lazy tongs, each of said tong having end joints respectively connected to said first and second frames; and
   another connecting means comprising second three triangulated lazy tongs, said another connecting means having a central portiion connected to said first frame; and two distal bars disposed on either side of said central portion and connected to second end joints of said second lazy tongs, said second lazy tongs being oriented transversally with respect to said first lazy tongs; whereby said distal bars can support said object transversally with respect to said first connecting means.

2. The support of claim 1 further comprising interconnecting means adapted to move one of said bars toward or away from said central portion when the other bar is moved toward or away from said central portion respectively, whereby said two bars are always equidistant from said central portion.

3. The support of claim 1 wherein said first and second frames are removably connected to said connecting structure, whereby said support may be disassembled when not in use.

* * * * *